United States Patent [19]
Chandler et al.

[11] Patent Number: 4,546,169
[45] Date of Patent: Oct. 8, 1985

[54] PROCESS FOR PREPARATION OF POLYESTER POLYOLS UTILIZING POLYALKYLENE TEREPHTHALATE

[75] Inventors: Larry L. Chandler, Greensboro; Thurston R. Friar, Jamestown; Berwyn W. Green, Greensboro, all of N.C.

[73] Assignee: Foam Systems Company, Riverside, Calif.

[21] Appl. No.: 642,136

[22] Filed: Aug. 17, 1984

[51] Int. Cl.$^4$ ............................................. C08G 63/02
[52] U.S. Cl. ..................................... 528/272; 521/172; 521/174; 528/274; 528/480; 528/501
[58] Field of Search ............... 528/272, 274, 480, 501; 521/172, 174

[56] References Cited

U.S. PATENT DOCUMENTS

| | | | |
|---|---|---|---|
| 4,230,818 | 10/1980 | Broughton et al. | 528/272 |
| 4,307,224 | 12/1981 | Rogier | 528/272 |
| 4,379,912 | 4/1983 | Lu | 528/274 |
| 4,499,261 | 2/1985 | Heinze et al. | 528/279 |

*Primary Examiner*—Lucille M. Phynes
*Attorney, Agent, or Firm*—Lyon & Lyon

[57] ABSTRACT

The process of the present invention reacts a polyhydric alcohol and a second reactant selected from the group consisting of polycarboxylic acid, anhydride or an ester of a polycarboxylic acid in a first reactor to produce a flowable intermediate ester. During this reaction, volatile by-product is removed. The flowable intermediate ester is transferred to a holding vessel from which it is metered to a second reactor. Additional polyhydric alcohol may be added to the flowable intermediate ester which may be preheated by heat exchange with the finished polyester before introduction to the second reactor. A polyalkylene terephthalate feed is introduced to the second reactor in which it is reacted to form a finished polyester which is continuously removed from the second reactor. By altering the feeds to the second reactor, the physical characteristics of the finished polyester may be changed to meet various specifications.

54 Claims, 2 Drawing Figures

PROCESS FOR PREPARATION OF POLYESTER POLYOLS UTILIZING POLYALKYLENE TEREPHTHALATE

BACKGROUND OF THE INVENTION

The present invention relates to a process for the production of polyester polyols useful in the production of rigid foams.

It is known to prepare rigid polyurethane foams by the reaction of a polyisocyanate with a hydroxyl-terminated polyester, polyether or polyamide. However, the properties of rigid polyurethane foams can differ markedly depending upon the composition of the materials reacted. Further, the composition of the materials reacted can have a significant effect upon the ultimate cost of a particular rigid polyurethane foam. Accordingly, there has been constant change within the polyurethane industry to seek new and improved reactants which are useful in the preparation of rigid polyurethane foams having superior properties or physical characteristics or which reduce the cost of rigid polyurethane foam, or both.

In striving to achieve a rigid polyurethane foam having the property of increased fire resistance, it is known that the industry has sought to utilize cellular polymers in which the major recurring polymer is isocyanurate. See, for example, U.S. Pat. Nos. 3,516,950; 3,625,872; 3,644,232; 3,676,380; 3,725,319; 3,745,133; 3,763,057; 3,793,236; 3,799,896; 3,849,349; 3,876,568; 3,891,579 and 3,909,465. However, the physical properties of the foregoing compositions can vary widely as can the cost of such materials. Thus, the usefulness of such materials can vary depending upon the cost to produce the materials as well as the use to which the materials are to be put. In regard to the cost of the materials, the process by which the materials are produced may be a determinative factor in choosing between somewhat analogous materials. In addition, the utilization of a cheap starting material in a suitable process may also be a determinative factor in choosing between somewhat analogous materials.

A key material in the production of rigid polyurethane foams and several additional end products, is the polyol reactant. The preparation of polyester polyols by the reaction of polycarboxylic acids, anhydrides or esters of polycarboxylic acids with polyhydric alcohols is well known. Generally, the processes of the prior art involve a one-step reaction of the polycarboxylate source with a stoichiometric excess of a polyhydric alcohol. A sufficient excess of alcohol is particularly employed to provide polyesters with low acid numbers.

One of the problems associated with the prior art is in utilizing the large and expensive reactors required to produce the reaction materials in an optimum manner. In the normal procedure for the preparation of polyester polyols, all the reactants are charged to a reactor, and as the reaction proceeds, the water or other volatile product of the reaction is removed from the reactor by distillation. With this procedure, however, only a limited proportion of the contents actually participate in producing the volatile by-product.

Another problem resulting from charging all the reactants at once is that materials that dissolve or digest with difficulty grossly impede the agitation in the reactor and extend the processing and reaction times.

If a high melting product, such as polyethylene terephthalate, for example, is added to the product of the first step, other problems develop. The time of solution at temperatures too low can be excessive and increase processing costs. If higher temperatures are used, excessive loss of glycols through volatilization or decomposition results and causes loss of color.

For examples of prior processes, see, by way of partial example only, U.S. Pat. Nos. 3,162,616; 3,716,523; 3,846,347; 3,865,806; 3,884,850; 3,907,863 and 4,018,815 and Canadian Pat. Nos. 1,127,636 and 1,150,315.

In an attempt to solve at least some of the problems associated with the prior art, U.S. Pat. No. 4,223,068, the disclosure of which is specifically incorporated herein by reference, described a method for making rigid polyurethane foam wherein from 5 to 30% of the weight of an organic polyol is a digestion product of polyalkylene terephthalate. The use of a digestion product prepared by digesting polyalkylene terephthalate residues in organic polyols was described as providing unexpected properties and reduced product cost in U.S. Pat. No. 4,417,001, the disclosure of which is specifically incorporated herein by reference. However, while both of these patents described the improved properties and lower cost attained through the use of digested polyalkylene terephthalate, a need for a very efficient process for the preparation of such compounds was not widely recognized. In U.S. Pat. No. 4,439,550, the disclosure of which is specifically incorporated herein by reference, the use of scrap polyalkylene terephthalate was reviewed. However, the prior art has been concerned with the actual use of a polyaklyene terephthalate in known processes rather than in more efficient processes which can utilize the advantages of a polyalkylene terephthalate. Further, processes to vary the physical characteristics of the materials derived from the same reactants have been, for the most part, either ignored or relegated little attention. Thus, while a batch process could be altered depending upon desired characteristics, such alteration probably would not maximize the use of the chemical production equipment in use.

Accordingly, there exists a need for processes which allow easy alteration of the physical properties of materials useful in the manufacture of rigid polyurethane foams at a minimal cost. In addition, a need also exists for processes for preparing polyester polyols which minimize cost by providing improved utilization of reactor capacity, improved quality of the final product and increased yield.

SUMMARY OF THE INVENTION

The present invention is generally directed to a process which can continually produce high quality polyester polyols with predetermined sets of physical characteristics which may be altered to obtain modified products with new sets of predetermined physical characteristics.

The process of the present invention reacts a polyhydric alcohol and a second reactant selected from the group consisting of polycarboxylic acid, anhydride or an ester of a polycarboxylic acid in a first reactor to produce a flowable intermediate ester. During this reaction, volatile by-product is removed. The flowable intermediate ester is transferred to a holding vessel from which it is metered to a second reactor. Additional polyhydric alcohol may be added to the flowable intermediate ester which may be preheated by heat exchange with the finished polyester before introduction to the second reactor. A polyalkylene terephthalate feed is introduced to the second reactor in which it is reacted to form a finished polyester which is continuously removed from the second reactor. By altering the feeds to the second reactor, the physical characteristics of the finished polyester may be changed to meet various specifications.

Because the process of the present invention utilizes a continuous step in the second reactor, improved utilization of reactor capacity permits the combined physical dimensions of the first and second reactors to be less than the dimensions which would be required in a single batch operation. In addition, since the second reactor utilizes a continuous step, the polyalkylene terephthalate feed, which is commonly in a solid state, can be reacted more efficiently over a shorter time in a smaller reactor than would be possible in a batch system. Thus, the present invention provides an efficient and economical process for the production of polyester polyols from scrap polyalkylene terephthalate feed.

The present invention also provides an efficient process for producing polyester polyols having differing sets of predetermined physical characteristics from scrap polyalkylene terephthalate feed. In prior processes, a new batch would have to be utilized each time a new specification of physical characteristics was required. Additionally, depending upon the process, purification steps might be required. Further, if less than a full batch of the polyester polyol having altered physical characteristics was required, then the operational equipment would have to be operated at less than capacity or excess altered polyester polyol would be produced, either of which would increase the production cost of the altered polyester polyol. By contrast, the present invention provides an economical process for altering the physical characteristics of polyester polyol produced on a continuous basis from the second reactor with minimal increase in production cost associated with the alteration. The possibility of altering the final product also permits the process to improve the quality of the final product while the yield may be increased.

In addition to the foregoing advantages, the present invention also provides a more efficient process to react scrap polyalkylene terephthalate feed to form a polyester polyol useful for the production of rigid foams. Thus, in one aspect of the present invention, the reaction product of the second reactor are utilized to produce a final polyester polyol which is continuously removed to preheat the flowable feeds entering the second reactor.

In another aspect of the present invention, the feeds are introduced into the second reactor at different points to maximize the heat value of the flowable intermediate ester to help react the scrap polyalkylene terephthalate feed. Further, this feed arrangement, coupled with the continuous removal of the final polyester polyol, creates a mixing effect which eliminates the need for mechanical stirring of the second reactor.

Accordingly, it is a primary object of the present invention to provide an improved process for the production of polyester polyols from polyalkylene terephthalate.

This and further objects and advantages will be apparent to those skilled in the art in connection with the drawings and the detailed description of the preferred embodiment set forth below.

DETAILED DESCRIPTION OF THE PREFERRED EMBODIMENT

Figure 1:
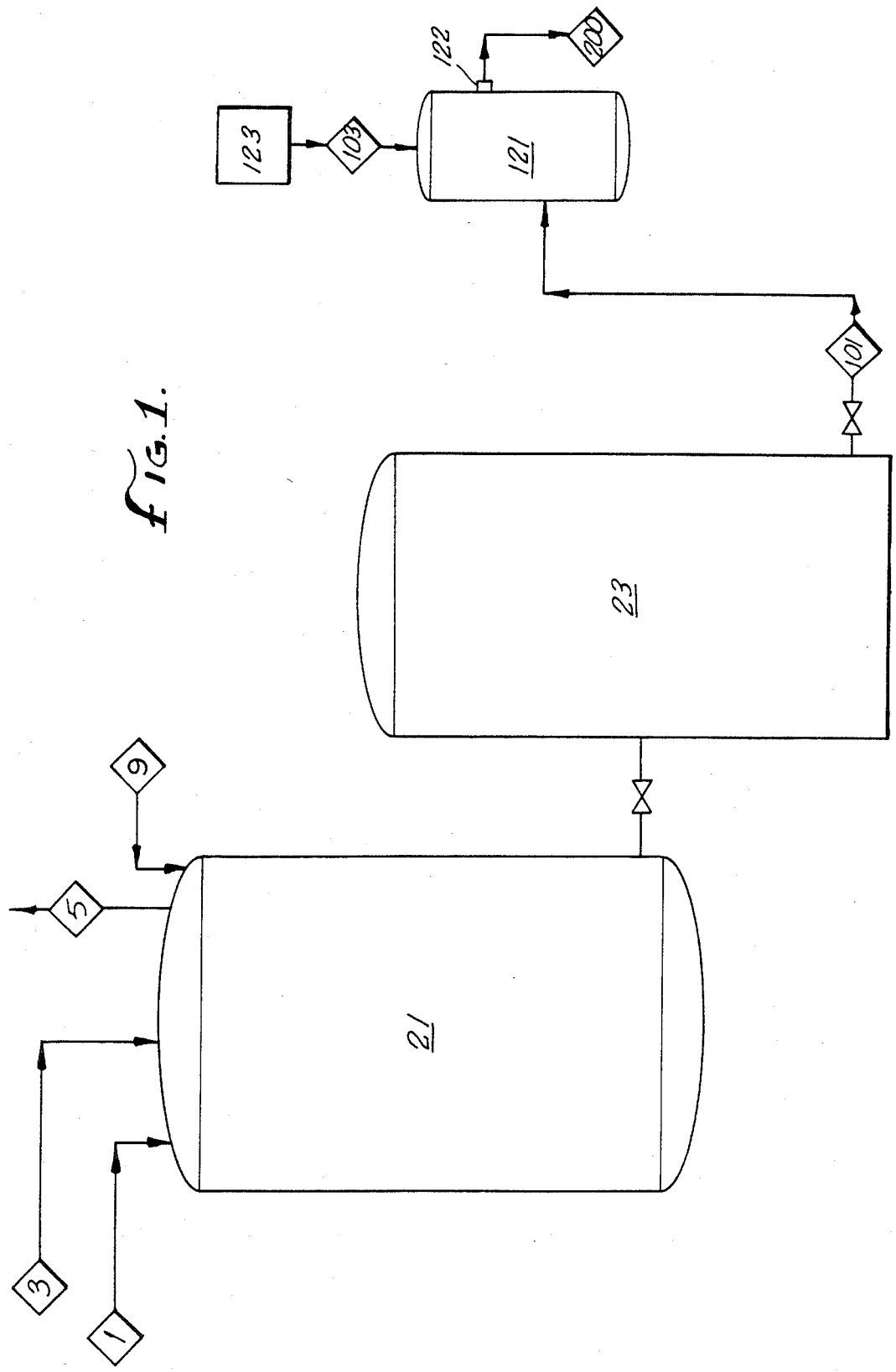
FIG. 1 is a schematic view of a preferred embodiment of the process of the present invention.

The present invention utilizes esterification and transesterification reactions to prepare polyester polyols.

The first reaction of the present process produces an intermediate ester which is then utilized in the transesterification reaction. The intermediate ester is formed by reacting any suitable polyhydric alcohol with a suitable second reactant selected from the group consisting of a polycarboxylic acid, its esters or an anhydride. Representative polycarboxylic acids, esters or anhydrides which may be employed include oxalic, malonic, succinic, glutaric, adipic, pimelic, suberic, azelaic, sebacic, brassylic, thapsic, maleic, fumaric, glutaconic, a-hydromuconic, B-hydromuconic, a-butyl-a-ethyl-glutaric, a-B-diethylsuccinic, isophthalic, terephthalic, hemimellitic and 1,4-cyclohexanedicarboxylic. Representative polyhydric alcohols which may be employed include both aliphatic and aromatic such as ethylene glycol, diethylene glycol, dipropylene glycol, triethylene glycol, tetraethylene glycol, trimethylene glycol, 1,2-propylene glycol, 1,4-tetramethylene glycol, 1,2-butylene glycol, 1,4-butane diol, 1,3-butane diol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, neopentylglycol, dibromoneopentylglycol, 1,10-decanediol and 2,2-bis (4-hydroxycyclohexyl) propane.

The esterification reaction of the present invention is generally carried out in the presence of an inert atmosphere such as nitrogen or carbon dioxide. Generally, the acid, ester or anhydride component and a portion of the polyhydric alcohol are charged to a reactor with stirring and the charge is heated to a temperature between about 130° C. to about 240° C. Heating is continued such that any volatile by-product of esterification can be rapidly removed, generally by distillation. It is preferable that virtually all of the theoretical volatile by-product of esterification from the reactor is removed. Esterification is continued until the acid number of the polyol is less than about five and substantially all of the volatile by-product of esterification is removed. Thereafter, the intermediate ester product is transferred to a holding vessel.

The intermediate ester is held under a nitrogen or carbon dioxide atmosphere at a temperature sufficiently high to maintain its fluidity and facilitate subsequent reaction, but not high enough to cause significant decomposition and deterioration of its properties. It has been found that phthalic anhydride is particularly useful in preparing a preferred flowable intermediate ester, especially when diethylene glycol is chosen as the preferred polyhydric alcohol.

A polyalkylene terephthalate feed stream is introduced to a second reactor which may be relatively small and inexpensive compared to the first reactor. A preferred polyalkylene terephthalate feed stream is solid polyethylene terephthalate scrap. The intermediate ester is metered nearly continuously and simultaneously into the second reactor. The charge in the second reactor is maintained at a nearly constant temperature between about 180° C. to about 250° C. The hold-up time in this reaction is much less than when volatiles must be removed and is controlled by the minimum time required for the system to nearly reach chemical equilibrium but with minimum decomposition or other loss of chemicals. The transesterification is normally carried out at normal atmospheric pressure but either elevated or reduced pressure is feasible.

Although the transesterification reaction proceeds promptly with heating and a catalyst is not necessarily required, a catalyst may be employed during the reaction. Representative esterification catalysts include organic metal compounds such as those described in U.S. Pat. Nos. 3,162,616 and 3,716,523, the disclosures of which are specifically incorporated herein by reference.

The total time for the first reaction may vary from six hours to 48 hours, preferably from 12 hours to 24 hours. The time will depend on the reactivity of the reactants, the stoichiometry, temperature and pressure employed in the reaction, the molecular weight of the resulting polyester polyols, the rapidity with which the water of esterification is removed and the activity of the catalyst employed, if any.

The average time for transesterification also varies but is typically from about one to about six hours. This time will depend on the same type of factors previously noted for the esterification reaction; however, it will also depend upon the length of time it takes solid polyalkylene terephthalate scrap to be dissolved. It has been found that in the process of the present invention solid polyethylene scrap may be dissolved in less than about six hours, and even in as little as one to four hours.

Although the polyester polyols prepared in the subject invention are particularly useful in the preparation of polyurethane compositions including rigid foams, the polyester polyols may also be used as textile coatings (tie coatings and top coatings), elastomers, shoe sole composites, flexible and microcellular foams, as well as urethane rubbers, sealants and adhesives.

The following examples illustrate the reactions of the present invention. All parts are by weight unless otherwise indicated.

EXAMPLE I

A 12-liter, three-neck, round bottom flask, equipped with stirrer, nitrogen inlet and distillation head with a water cooled condenser and tared receiver was charged with 5,152 grams (48.6 mols) of diethylene glycol and was heated to approximately 100° C. 2.4 grams of tetrabutyltitanate catalyst was added. Under nitrogen and while maintaining a temperature of approximately 100° C., and with constant stirring, 2,878 grams (19.4 mols) of phthalic anhydride were added. The temperature of the batch was gradually increased over approximately five hours to 230° C. Distillate was collected and the acid number of the bottoms product was measured until a value of 1.9 attained. The bottoms product was a clear, nearly colorless liquid, weighing 7,516 grams (97.9% yield). The hydroxyl number of the product was 433 and its viscosity was 645 cps at 25° C. The mole ratio of the diethylene glycol to phthalic anhydride ester mixture was 2.5/1.

EXAMPLE II

A two-liter, three-necked, round bottom flask, equipped with a stirrer, thermometer, nitrogen inlet and distillation head with a water cooled condenser was charged with 1,306 grams of the ester produced in Example I. Under a nitrogen atmosphere, 0.36 gram of tetrabutyltitanate catalyst was added and the temperature was increased to approximately 205° C. and reclaimed polyethylene terephthalate chips were added over a two-hour period. The resulting solution was held for an additional hour at 215°–225° C. A small amount of distillate was collected and 1,868 grams (98.3% yield) of product having a hydroxyl number=281, viscosity at 25° C. =11,500 cps and acid number=0.98 were produced.

EXAMPLE III

A two-liter, three-necked, round bottom flask, equipped with a thermometer, stirrer, nitrogen inlet, distillation head with a water cooled condenser and a tared receiver was charged with 1,100 grams (20.7 mols) of diethylene glycol. Under a nitrogen atmosphere, this material was heated to approximately 100° C. and 880 grams (11.9 mols) of phthalic anhydride flake were added, while the temperature was maintained at 100°–120° C. The resulting solution was heated over about six hours to 230° C. Distillate, principally water, was collected while the acid number decreased to 2.3. The product, 1,992 grams (99.2% yeild), was a nearly colorless liquid with a hydroxyl number=247 and viscosity=7,400 cps at 25° C. The mole ratio of diethylene glycol to phthalic anhydride ester was 1.75/1.

EXAMPLE IV

Into the same flask as used in Example II, 1,020 grams of the product of Example III were charged. To this were added an additional 320 grams of diethylene glycol and one gram of tetrabutyltitanate. This mixture was heated to 215° C. and maintained at this temperature while 660 grams of reclaimed polyethylene terephthalate chips were added over a period of approximately one hour. The resulting solution was held at 215°–230° C. for two additional hours. Small quantities of distillate were removed and 1,970 grams (98.5% yield) product, with a hydroxyl number=260 and 12,500 cps viscosity at 25° C., were produced. Its acid number was 1.9.

EXAMPLE V

A 1,000-gallon stainless steel reactor, equipped with a thermo recorder/regulator, mechanical stirrer, nitrogen inlet, distillation head with water cooled condenser and receiver was fitted with openings for receiving metered quantities of glycol, reclaimed polyethylene terephthalate chips and product as described in Example III. The reactor was charged to its point of automatic overflow with material like that produced in Example IV.

The product in the reactor was heated to 215° C.±5° C. and maintained at that temperature while polyethylene terephthalate chips, diethylene glycol and o-phthalic acid ester to which had been added 0.05% tetrabutyltitanate were simultaneously and continuously metered into the reactor at rates of 20.0 pounds/minute, 9.0 pounds/minute and 31.2 pounds/minute, respectively. Trace quantities of distillate containing largely water was continuously removed.

The product produced continuously was found to have a hydroxyl number=260±15 and a viscosity from 9,000 to 15,000 cps when measured at 25° C. The acid number was consistently less than 2.5 and moisture content was less than 0.2%. The product was suitable for the production of rigid foams.

EXAMPLE VI

Into the same flask as used in Example II, 828 grams of the product from Example III were charged. To this were added 145 grams of glycerine and 0.4 gram of tetrabutyltitanate catalyst. While being agitated, the mixture was increased in temperature to 225° C. and held at that temperature for two hours. 1,463 grams (97.5% yield) of polyester were obtained, having a hydroxyl number=278 and a viscosity of 11,000 cps at 40° C. Its acid number was 0.6. The 19 grams of distillate recovered had a density of 1.10 grams per cc. Gas chromatography covered had a density of 1.10 grams per cc. Gas chromatography indicated that the distillate was largely ethylene glycol.

The process of the present invention is illustrated by FIG. 1. A first reactor 21 is fed by a first stream 1 of a polyhydric alcohol and a stream 3 of a second reactant. The first reactor 21 can be of any suitable design which will allow the esterification reaction of the polyhydric alcohol and the second reactant to proceed at a first temperature which is preferably between about 140° C. to about 240° C. The first temperature should be chosen to facilitate the esterification reaction without exceeding the boiling point of the polyhydric alcohol. Accordingly, the basic design of the first reactor 21 including such possible features as heating and agitation is deemed to be well within the skill of one of ordinary skill in the art. However, unlike most reactors common in the industry, the first reactor must be capable of removing a volatile by-product stream 5 during the esterification reaction. After the esterification reaction is complete and an intermediate ester has been formed, the flowable intermediate ester of the first reactor 21 is transferred to a holding vessel 23 in which it is held in a flowable condition. It has been found that it is preferable for the polyhydric alcohol to be reacted in an amount about 1.7 to about 2.5 times stoichiometry to achieve a preferred acid number which is less than about 5, with an acid number between about 1.7 to about 2.7 being especially preferred.

If a catalyst is desired in the transesterification reaction, a catalyst 9 can be added to the first reactor 21. However, it is believed that it is preferable to add the catalyst to the process at a point where the intermediate ester is at a temperature less than about 180° C. to avoid potential degradation of the catalyst. Thus, the catalyst 9 could be added to the first reactor 21 after esterification is complete and the flowable intermediate ester has cooled, the catalyst could be added while the intermediate ester is transferred to holding vessel 23 or the catalyst 9 could be added at some point before the flowable intermediate ester is later metered into a second reactor 121.

Once an initial amount of flowable intermediate ester has been transferred to holding vessel 23, the transesterification step may begin initial process start-up in the second reactor 121 by metering a stream 101 of the intermediate ester from the holding vessel 23 to the second reactor 121. Since the present invention is especially well suited to the use of solid scrap polyethylene terephthalate, the invention will hereinafter be described as using polyethylene terephthalate which is in a solid state. A polyethylene terephthalate feed 103 from a polyethylene terephthalate storage source 123 is also passed into the second reactor 121. A feed hopper could be used as part of the polyethylene terephthalate storage source 123 to introduce the polyethylene terephthalate feed 103 to the second reactor 121.

Figure 2:
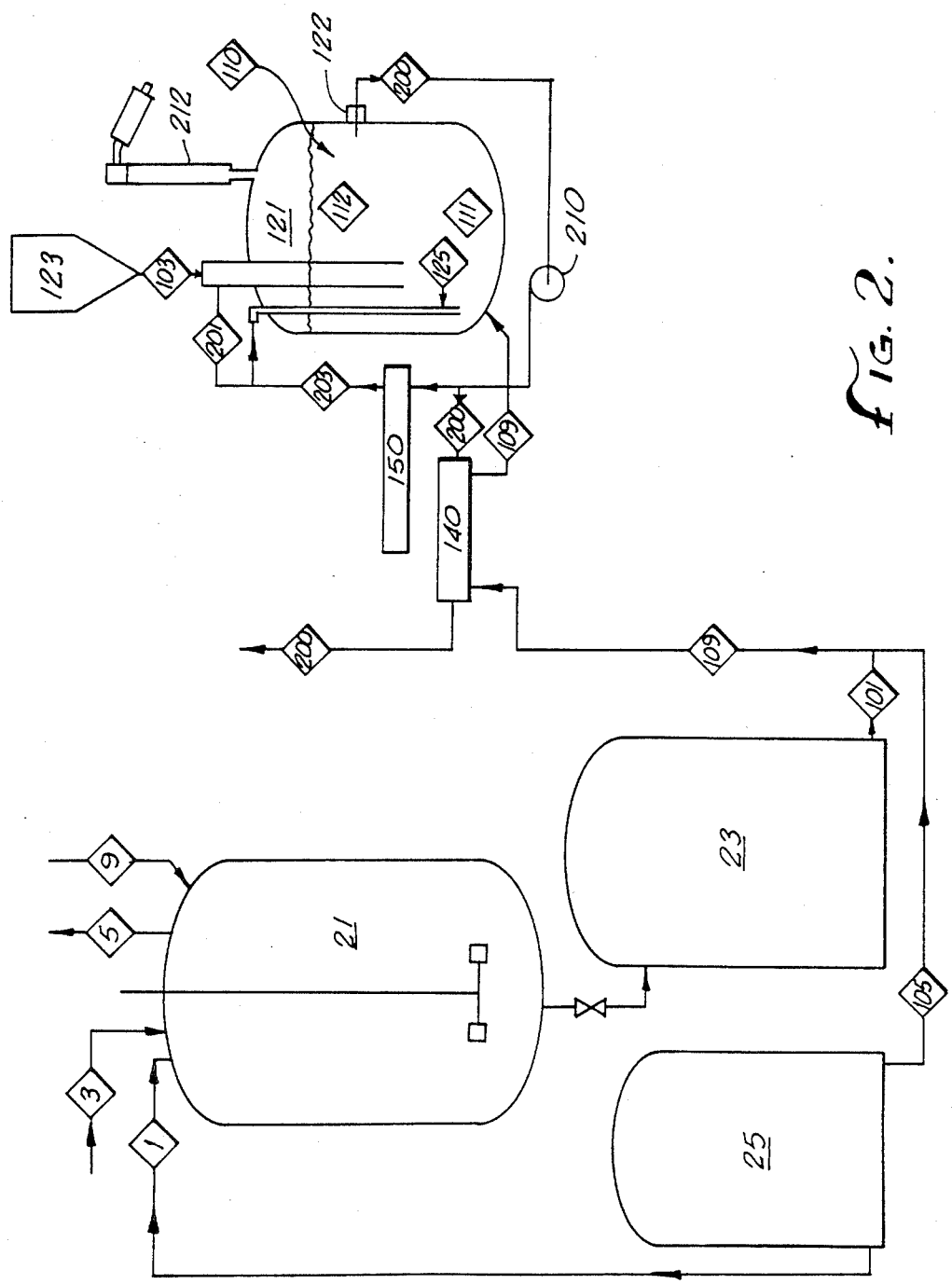
FIG. 2 is a schematic view of an alternative preferred embodiment of the process of the present invention.

Because the process of the present invention may be utilized to produce final polyester polyols having varied physical characteristics, the feed streams introduced to the second reactor 121 may be altered to produce polyester polyols having different predetermined sets of physical characteristics. Thus, the feed ratio of the polyethylene terephthalate feed 103 to the stream 101 may be altered. In addition, it has been found desirable to add an additional polyhydric alcohol stream 105 to the stream 101 before introduction to the second reactor 121. The availability of a metered second polyhydric alcohol stream 105 provides the process of the present invention with the advantage that uniform batches of intermediate ester can be produced in first reactor 21 and transferred to holding vessel 23. Thereafter, by the metered addition of the second polyhydric alcohol stream 105 to the stream 101, the physical characteristics of a combined intermediate ester feed stream 109 to second reactor 121 can be altered to produce new physical characteristics of the final product stream 200 of polyester polyol. As shown in FIG. 2, the first and second streams of polyhydric alcohol, 1 and 105, respectively, can be metered from a common polyhydric alcohol source 25. Alternatively, although not depicted in the drawings, there could be a separate source for the second stream of polyhydric alcohol 105. While it will be assumed hereinafter that the polyhydric alcohol of stream 105 is the same as the polyhydric alcohol of stream 1, it is not required that said polyhydric streams be identical. Likewise, the term "polyhydric alcohol" as used herein is intended to encompass a single polyhydric alcohol or mixtures of polyhydric alcohols. Similarly, the term "second reactant" as used herein is intended to encompass a single reactant or suitable mixtures of reactants selected from the group consisting of polycarboxylic acid, anhydrides or an ester of a polycarboxylic acid.

The second reactor 121 depicted in FIG. 2 is utilized to react the intermediate ester with polyethylene terephthalate feed 103 at a second temperature to form a final product stream 200 of polyester polyol which is continuously removed from the second reactor at exit port 122. The second temperature should be chosen so as to allow the polyethylene terephthalate feed 103 to be dissolved without exceeding the boiling point of the polyhydric alcohol. Accordingly, it has been found that the second temperature should be maintained at a constant temperature between about 140° C. to about 250° C. with the temperature range of between about 220° C. to about 240° C. being especially preferred.

To attain the second temperature, it is desirable to heat the stream 101 or combined stream 109 to the second temperature before it is introduced to the second reactor 121. After start-up of the process of the present invention, the final product stream 200 of polyester polyol can be used to preheat the stream 101 or combined stream 109 by heat exchange. Thus, the stream 101 or combined stream 109 and the final product stream 200 of polyester polyol can be introduced to heat exchanger 140. To provide initial heating during start-up and make-up heat during normal operation, when required, a conventional heater 150 is utilized. Thus, as shown in FIG. 2, the heater 150 is used to maintain the proper temperature in reactor 121. From the primary circulating stream 203, a small diversion stream 201 is used to wash the polyethylene terephthalate feed 103 into second reactor 121. Since the diversion stream 201 is at an elevated temperature, it can also be used to help partially dissolve the polyethylene terephthalate feed 103 before it is introduced to the liquid charge 110 of the second reactor 121.

As the primary source of heating, the primary circulating stream 203 is used to provide additional heating to the bottom half of liquid charge 110, said bottom charge being depicted generally as 111 while the top half of the liquid charge 110 is depicted generally as top charge 112. This additional heating is supplied through the introduction of the primary stream 203 to the bottom charge 111 by pump 210 through pipe 125. Since the polyethylene terephthalate feed 103 will settle to the bottom charge 111, the additional heating supplied by the primary circulating stream 203 will help to decrease the time it takes polyethylene terephthalate feed 103 to dissolve into the liquid charge 110. Similarly, it is preferable to introduce either stream 101 or 109 to bottom charge 111 to take advantage of the heat of these streams which should be slightly higher than the second temperature to compensate for the polyethylene terephthalate feed 103 which is not preheated to the second temperature. Thus, it should be apparent that local temperature gradients will exist in the liquid charge 110 even though the average temperature should remain relatively constant. An overhead stream consisting primarily of glycols and volatiles is removed through partial condenser 212.

Surprisingly, the second reactor 121 depicted in FIG. 2 does not require mechanical agitation. The location of the points of addition and incoming primary circulating stream 203 to the liquid charge 110 create a natural mixing which may possibly be further enhanced through temperature gradients. Because no mechanical agitation is required, minimal solid particles from polyethylene terephthalate feed 103 are withdrawn from the second reactor 121 while the final product stream 200 is continuously withdrawn through exit port 122. In addition, there is no potential operational or maintenance problems which can be associated with agitation systems. Further, the final product stream 200 removed at exit port 122 tends to approach equilibrium conditions.

When the process of the present invention initially undergoes start-up, it will take a certain time for the second reactor to approach equilibrium. Once the start-up time has passed, the final product stream 200 may be continuously removed. However, if it is desired to obtain a modified finished product, the volume of at least one of stream 101, polyethylene terephthalate feed 103 or additional polymer alcohol stream 105 can be altered to obtain a modified finished product with a new set of predetermined physical characteristics after a new equilibrium is reached. It has been found that a new equilibrium can be reached in as little as eight hours when the turn-around time, which is defined as the time to remove a volume of liquid from the second reactor 121 through exit port 122 equal to the volume of liquid held in the second reactor 121, is six hours. It has also been found that solid polyethylene terephthalate contained in polyethylene terephthalate feed 103 may be dissolved in less than six hours, and even in as little as one to four hours.

Having fully described the present invention, it will be apparent to those skilled in the art that modifications to the processes described herein may be made without departing from the scope of the present invention. Therefore, the scope of this invention is not intended to be limited except as may be required by the lawful scope of the following claims.

What is claimed is:

1. A process for the preparation of a polyester polyol, comprising the steps of:
   (a) reacting in a first reactor a polyhydric alcohol and a second reactant selected from the group consisting of a polycarboxylic acid, anhydride or an ester of a polycarboxylic acid at a first temperature with removal of a volatile by-product until a flowable intermediate ester has been produced;
   (b) transferring the intermediate ester to a holding vessel in which it is held in a flowable condition;
   (c) metering the intermediate ester to a second reactor;
   (d) metering a recycled polyalkylene terephthalate feed to the second reactor; and
   (e) reacting the intermediate ester with the polyalkylene terephthalate feed at a second temperature to form a finished polyester which is continuously removed from the second reactor.

2. A process as recited in claim 1 wherein the polyhydric alcohol is initially used to charge the first reactor, the polyhydric alcohol is then heated to a temperature between about 140° C. and about 240° C. and the second reactant is then added to the first reactor.

3. A process as recited in claim 2 wherein an additional amount of polyhydric alcohol is added to the first reactor after the second reactant has been added to said first reactor.

4. A process as recited in claim 3 wherein substantially all of the volatile by-product generated by the addition of the second reactant is removed before the additional amount of polyhydric alcohol is added to the first reactor.

5. A process as recited in claim 1 wherein the polyhydric alcohol is comprised of diethylene glycol and the second reactant is comprised of phthalic anhydride.

6. A process as recited in claim 1 wherein the second temperature is maintained between about 220° C. to about 240° C.

7. A process as recited in claim 1 wherein the flowable intermediate ester has an acid number less than about 5.

8. A process as recited in claim 1 wherein the intermediate ester is preheated before being passed to the second reactor by heat exchange relationship with the finished polyester.

9. A process as recited in claim 1 wherein a catalyst is added to the first reactor.

10. A process as recited in claim 1 comprising the further steps of cooling the flowable intermediate ester and then adding a catalyst to the flowable intermediate ester before said intermediate ester is transferred to the holding vessel.

11. A process as recited in claim 1 wherein the polyalkylene terephthalate feed is metered into the second reactor in a solid state which is dissolved in said second reactor in less than about one hour.

12. A process as recited in claim 1 or 11 wherein the second reactor has an average residence time of less than about six hours.

13. A process as recited in claim 12 wherein the approximate weight ratio of polyalkylene terephthalate feed to the flowable intermediate ester is greater than 1:2.

14. A process as recited in claim 1 wherein the yield of the finished polyester is in excess of about 98%.

15. A process as recited in claim 1 wherein the second reactor is maintained at a substantially constant volume during continuous operation.

16. A process as recited in claim 1 wherein steps (a) and (b) are repeated and steps (c) through (e) are continuous.

17. A process as recited in claim 1 wherein the intermediate ester is metered into a bottom half of the second reactor, the polyalkylene terephthalate feed is metered into a top half of the second reactor and the finished polyester is removed from the top half of the second reactor to create a mixing effect which helps to dissolve the polyalkylene terephthalate feed which settles into the bottom half of said second reactor.

18. A process as recited in claim 1 wherein an overhead stream consisting primarily of glycols is removed from the second reactor.

19. A process for the preparation of a polyester polyol, comprising the steps of:
 (a) charging a first reactor with a first amount of polyhydric alcohol and a second reactant selected from the group consisting of a polycarboxylic acid, anhydride or an ester of a polycarboxylic acid;
 (b) heating the polyhydric alcohol and the second reactant in the first reactor to a first temperature;
 (c) removing substantially all of a volatile by-product from the first reactor;
 (d) transferring a flowable intermediate ester formed in the first reactor to a holding vessel;
 (e) passing the intermediate ester through a heater to a second reactor;
 (f) metering a recycled polyalkylene terephthalate feed to the second reactor;
 (g) reacting the intermediate ester with the polyalkylene terephthalate feed to form a finished polyester with a predetermined set of physical characteristics; and
 (h) continuously passing the intermediate ester from the second reactor.

20. A process as recited in claim 19 wherein the heater is comprised of a heat exchanger through which the intermediate ester is passed.

21. A process as recited in claim 19 wherein steps (a) through (d) are repeated.

22. A process as recited in claim 19 wherein the polyhydric alcohol is comprised of diethylene glycol and the second reactant is comprised of phthalic anhydride.

23. A process as recited in claim 19 wherein the second temperature is maintained between about 220° C. to about 240° C.

24. A process as recited in claim 19 wherein the acid number is less than about 5.

25. A process as recited in claim 19 wherein a catalyst is added to the first reactor.

26. A process as recited in claim 19 comprising the further steps of cooling the flowable intermediate ester and then adding a catalyst to the flowable intermediate ester before said intermediate ester is transferred to the holding vessel.

27. A process as recited in claim 19 wherein the polyalkylene terephthalate feed is metered into the second reactor in a solid state which is dissolved in said second reactor in less than about one hour.

28. A process as recited in claim 19 or 27 wherein the second reactor has an average residence time of less than about six hours.

29. A process as recited in claim 19 or 27 wherein the approximate weight ratio of polyalkylene terephthalate feed to the flowable intermediate ester is greater than about 1:2.

30. A process as recited in claim 19 wherein the yield of the finished polyester is in excess of about 98%.

31. A process as recited in claim 19 wherein the second reactor is maintained at a substantially constant volume.

32. A process as recited in claim 19 wherein the intermediate ester is metered into a bottom half of the second reactor, the polyalkylene terephthalate feed is metered into a top half of the second reactor and said intermediate ester is removed from the top half of the second reactor to create a mixing effect which helps to dissolve the polyalkylene terephthalate feed which settles into the bottom half of said second reactor.

33. A process as recited in claim 22 wherein an overhead stream consisting essentially of water is removed from the second reactor.

34. A process for the preparation of a polyester polyol, comprising the steps of:
 (a) reacting in a first reactor a polyhydric alcohol and a second reactant selected from the group consisting of a polycarboxylic acid, anhydride or an ester of a polycarboxylic acid at a first temperature to from a volatile by-product and an intermediate flowable ester;
 (b) removing substantially all of the volatile by-product;
 (c) passing the intermediate ester from the first reactor to a holding vessel;
 (d) combining a stream of polyhydric alcohol with a stream of intermediate ester from the holding vessel to form a continuous feed stream which is introduced to a second reactor;
 (e) introducing a recycled polyalkylene terephthalate feed to the second reactor where it is reacted at a second temperature to form a finished product with a predetermined set of physical characteristics; and
 (f) continuously passing the finished product from the second reactor.

35. A process as recited in claim 34 wherein the continuous feed stream is heated to the second temperature before it is introduced to the second reactor.

36. A process as recited in claim 35 wherein the continuous feed stream is heated by heat exchange with the finished product.

37. A process as recited in claim 34 wherein steps (a) through (c) are repeated.

38. A process as recited in claim 34 wherein the polyhydric alcohol is comprised of diethylene glycol and the second reactant is comprised of phthalic anhydride.

39. A process as recited in claim 34 wherein the second temperature is maintained between about 220° C. to about 240° C.

40. A process as recited in claim 34 wherein the acid number is less than about 5.

41. A process as recited in claim 34 wherein a catalyst is added to the first reactor.

42. A process as recited in claim 34 comprising the further steps of cooling the flowable intermediate ester and then adding a catalyst to the flowable intermediate ester before said intermediate ester is transferred to the holding vessel.

43. A process as recited in claim 34 wherein the polyalkylene terephthalate feed is introduced into the second reactor in a solid state which is dissolved in said second reactor in less than about one hour.

44. A process as recited in claim 34 or 43 wherein the second reactor has an average residence time of less than about six hours.

45. A process as recited in claim 44 wherein the approximate weight ratio of polyalkylene terephthalate feed to the flowable intermediate ester is greater than about 1:2.

46. A process as recited in claim 34 wherein the yield of the finished polyester is in excess of about 98%.

47. A process as recited in claim 34 wherein the second reactor is maintained at a substantially constant volume during continuous operation.

48. A process as recited in claim 34 or 47 wherein the intermediate ester is metered into a bottom half of the second reactor, the polyalkylene terephthalate feed is metered into a top half of the second reactor and said intermediate ester is removed from the top half of the second reactor to create a mixing effect which helps to dissolve the polyalkylene terephthalate feed which settles into the bottom half of said second reactor.

49. A process as recited in claim 34 wherein an overhead stream consisting essentially of water is removed from the second reactor.

50. A process as recited in claim 34 wherein the volumes of the stream of polyhydric alcohol, the stream of intermediate ester and the recycled polyalkylene terephthalate feed are adjusted to obtain the finished product with the predetermined set of physical characteristics.

51. A process as recited in claim 34 or 37 comprising the further steps of:
 (g) altering the volumes of at least one of the streams of polyhydric alcohol, the stream of intermediate ester or the recycled polyalkylene terephthalate feed to obtain a modified finished product with a new set of predetermined physical characteristics.

52. A process as recited in claim 51 wherein steps (a) through (c) are repeated after the modified finished product is obtained.

53. A process as recited in claim 51 wherein step (g) is repeated to obtain at least one new modified finished product.

54. A process as recited in claims 1, 19 or 34 wherein the second reactant is comprised of phthalic anhydride.

* * * * *